US007128040B2

(12) United States Patent
Saito

(10) Patent No.: US 7,128,040 B2
(45) Date of Patent: Oct. 31, 2006

(54) APPARATUS FOR PREVENTING CUTTING OF SPIRAL SPRING FOR ENGINE STARTER

(75) Inventor: Morihiro Saito, Tokyo (JP)

(73) Assignee: Kyodo Rubber Industries Co., Ltd., Tokyo (JP)

( * ) Notice: Subject to any disclaimer, the term of this patent is extended or adjusted under 35 U.S.C. 154(b) by 22 days.

(21) Appl. No.: 11/074,878

(22) Filed: Mar. 8, 2005

(65) Prior Publication Data

US 2005/0199211 A1 Sep. 15, 2005

(30) Foreign Application Priority Data

Mar. 9, 2004 (JP) ............................ 2004-065609

(51) Int. Cl.
*F02N 5/02* (2006.01)
*F02N 3/02* (2006.01)
*F03G 1/02* (2006.01)

(52) U.S. Cl. ............................ 123/185.14; 123/185.3; 185/41 A

(58) Field of Classification Search ............. 123/185.2, 123/185.14, 185.3, 185.4; 185/41 A
See application file for complete search history.

(56) References Cited

U.S. PATENT DOCUMENTS

| | | | | |
|---|---|---|---|---|
| 1,217,762 A * | 2/1917 | Herzmark | ................ | 123/185.3 |
| 4,582,030 A * | 4/1986 | Reese | ...................... | 123/185.3 |
| 7,004,139 B1 * | 2/2006 | Saito | ...................... | 123/185.3 |
| 2002/0121258 A1 * | 9/2002 | Nieda et al. | ........... | 123/185.14 |
| 2002/0174848 A1 * | 11/2002 | Nieda et al. | ........... | 123/185.14 |

FOREIGN PATENT DOCUMENTS

| | | |
|---|---|---|
| JP | 07174061 | 7/1995 |

* cited by examiner

*Primary Examiner*—Stephen K. Cronin
*Assistant Examiner*—Arnold Castro
(74) *Attorney, Agent, or Firm*—Boyle Fredrickson Newholm Stein & Gratz S.C.

(57) ABSTRACT

An apparatus for preventing cutting of a spiral spring for an engine starter includes a rope reel to be rotated by a rope rounded thereon, a spiral spring to be wound up by the rope reel in order to accumulate a power therein, an engine starting pulley driven by the power accumulated in the spiral spring, and a device for preventing the spiral spring from being cut due to an overwinding. The device has a projection which projects from an outer peripheral surface of the engine starting pulley when the spiral spring is wound up fully by the rope reel and an outer diameter of the spiral spring is reduced, and an engaging device which is provided on the rope reel and which engages the projection.

8 Claims, 3 Drawing Sheets

APPARATUS FOR PREVENTING CUTTING OF SPIRAL SPRING FOR ENGINE STARTER

BACKGROUND OF THE INVENTION

1. Field of the Invention

The present invention relates to an apparatus for preventing cutting of a spiral spring and, more particularly, relates to an apparatus for preventing cutting of a spiral spring for an engine starter.

2. Description of the Prior Art

In the conventional engine starter, such as a so-called recoil starter, an engine starting pulley is rotated by pulling manually a rope wound around the pulley, and the rotation of the pulley is transmitted to a crank shaft of an engine through a centrifugal clutch. In such recoil starter, however, a large pulling force must be applied rapidly to the rope, and accordingly it is difficult to operate positively by a person of feeble strength.

Further, in case that the engine is an internal combustion engine, air pressure in the engine cylinder is fluctuated, and accordingly it is difficult to pull the rope of the conventional recoil starter smoothly and easily according to the load.

In the other conventional engine starter as disclosed in the Japanese Patent Application Laid-Open No. 174061/95, a spiral spring for driving the engine and a one-way clutch are used, and a rope is pulled manually several times to accumulate the spring force in the spiral spring so as to drive the engine.

In such engine starter, however, it is necessary to accumulate a large power in the spiral spring for driving the engine, and if the spiral spring is wound up excessively the spiral spring would be failed or cut.

SUMMARY OF THE INVENTION

In order to solve the foregoing problem in the conventional engine starter, it is an object of the present invention to provide a rope reel to be rotated by a rope rounded thereon, a spiral spring to be wound up by the rope reel in order to accumulate a power therein, an engine starting pulley driven by the power accumulated in the spiral spring, and a device for preventing the spiral spring from being cut due to an overwinding, said device having a projecting means, which is projected from an outer peripheral surface of the engine starting pulley when the spiral spring is wound up fully by the rope reel and an outer diameter of the spiral spring is reduced, and an engaging means provided on the rope reel for engaging with the projecting means.

Another object of the present invention is to provide an apparatus for preventing cutting of a spiral spring for an engine starter, wherein the projecting means is an arm having one and the other ends urged by a spring so that the one end of the arm is brought into contact with an outer peripheral surface of the spiral spring and the other end of the arm is brought into contact with the engaging means provided on the rope reel.

Further object of the present invention is to provide an apparatus for preventing cutting of a spiral spring for an engine starter, wherein the engine starting pulley forms a barrel drum encasing therein the spiral spring.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENT

Figure 1:
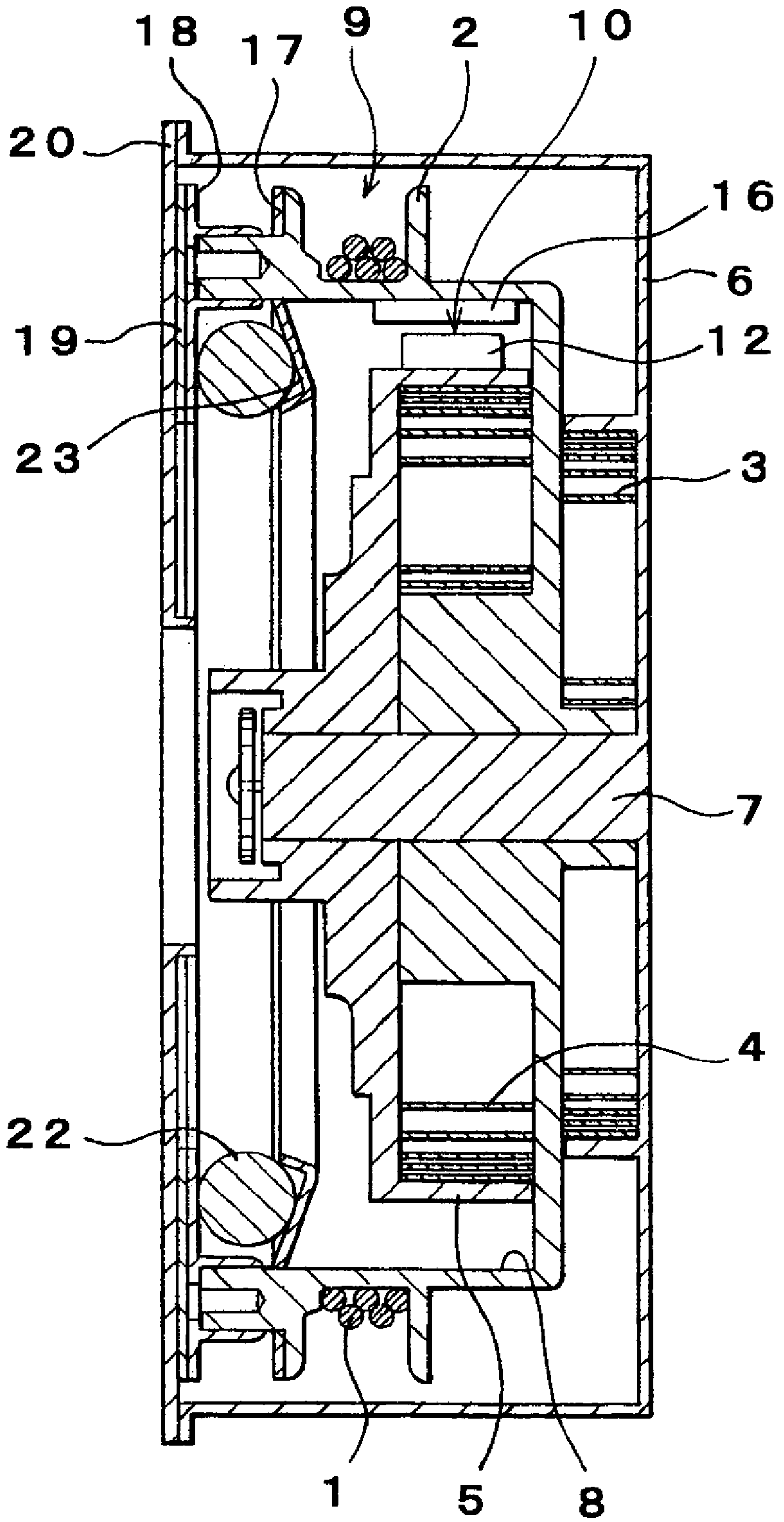
FIG. 1 is a vertically sectional view of an engine starter having an apparatus for preventing cutting of a spiral spring for an engine starter of the present invention.

The present invention will now be explained with reference to the drawings. FIG. 1 shows an engine starter having an apparatus for preventing cutting of a spiral spring according to the present invention. In FIG. 1, reference numeral 1 denotes a rope to be pulled manually, 2 denotes a rope reel to be rotated by the rope 1 wound around thereon, 3 denotes a first spiral spring arranged at one side of the reel 2, 4 denotes a second spiral spring arranged at the other side of the reel 2, 5 denotes an engine starting pulley to be driven by the second spiral spring 4, 6 denotes a stationary housing surrounding the rope reel 2, 7 denotes a shaft for supporting rotatably the rope reel 2 and the engine starting pulley 5 on the stationary housing 6, 8 denotes an inner peripheral surface of the rope reel 2 facing an outer peripheral surface of the engine starting pulley 5, 9 denotes a brake means for suppressing the rotation of the rope reel 2 when a rotary speed of the rope reel 2 is increased over a predetermined value at the recoiling state, and 10 denotes an apparatus for preventing cutting of a spiral spring according to the present invention.

Figure 2:
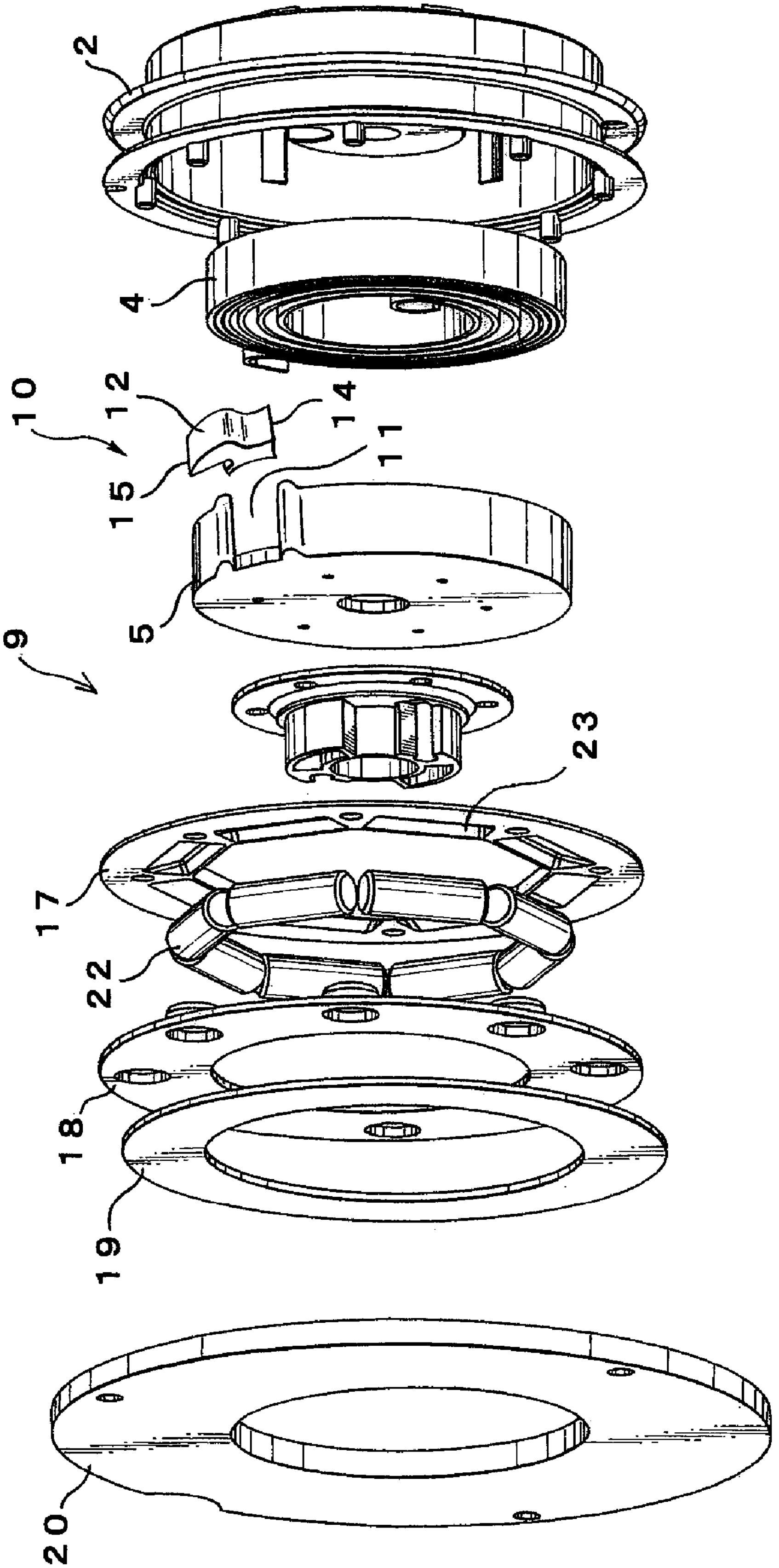
FIG. 2 is an exploded view of an engine starter shown in FIG. 1.
Figure 3:
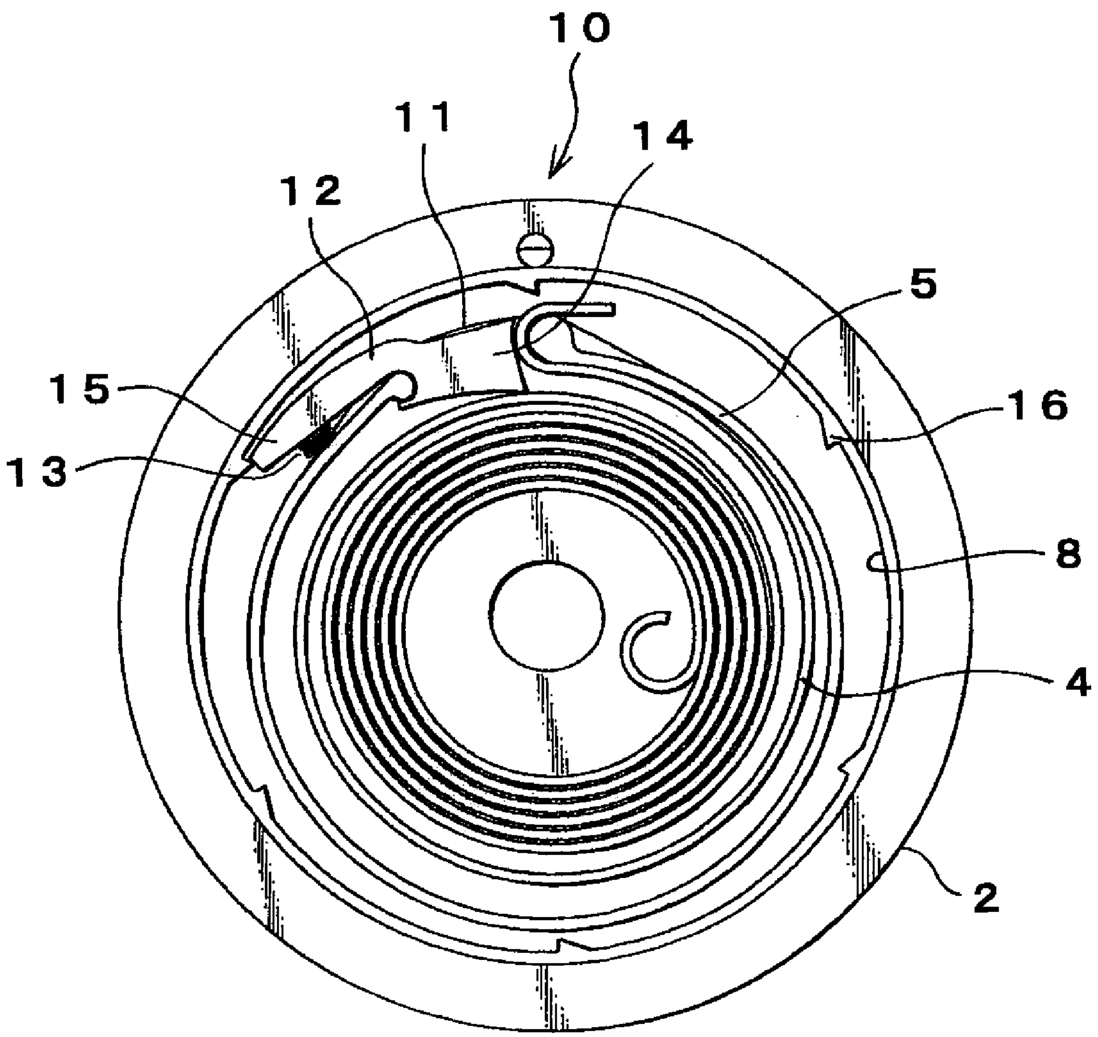
FIG. 3 is a side view of the engine starter shown in FIG. 1.

FIG. 2 and FIG. 3. show details of the apparatus for preventing cutting of the spiral spring according to the present invention. In FIG. 2 and FIG. 3, reference numeral 11 denotes an opening formed on the outerperiphery of the engine starting pulley 5, 12 denotes a rotary arm pivotally supported at a central lower portion thereof by the engine starting pulley 5, 13 denotes a spring for urging in the clockwise direction in FIG. 3 the rotary arm 12 so that one end 14 of the rotary arm 12 is positioned inside of the engine starting pulley 5 and the other end 15 is positioned outside of the engine starting pulley 5, and 16 denotes projections 16 formed separately in the circumferential direction from one another on the inner peripheral surface 8 of the rope reel 2 facing the outer peripheral surface of the engine starting pulley 5, each of the projections 16 being triangle in cross section having a slope inclined inwardly in the clockwise direction in FIG. 3 from the inner peripheral surface of the engine starting pulley 5 and a radial surface.

The above projection 16 may be formed of a quadrilateral or a trapezoid instead of the triangle in cross section, and formed on a side surface instead of the inner peripheral surface of the rope reel 2. One end of the first spiral spring 3 is fixed to the rope reel 2, and the other end thereof is fixed to the stationary housing 6. One end of the second spiral spring 4 is fixed to the engine starting pulley 5, and the other end of the second spiral spring 4 is fixed to the rope reel 2.

A reference numeral 17 denotes a pressure plate connected to the rope reel 2 and rotated therewith, 18 to 20 denote a brake rotor, a friction pad fixed to the brake rotor 18, and a brake plate fixed to the stationary housing 6, respectively, arranged in this order coaxially, 22 denotes a plurality of rollers, each arranged between the pressure plate 17 and the brake rotor 18, and 23 denotes an inclined surfaces formed on one surface of the pressure plate 17 facing the rollers 22, separated from one another in the circumferential direction thereof. Each of the inclined surfaces 23 is inclined by about 20 degrees toward the other side surface of the pressure plate 17 in order to form a concave portion for receiving the roller 22 therein. The brake rotor 18 is urged in the axial direction by a spring (not shown) so as to be separated from the friction pad 19 and so as to push the rollers 22 toward the pressure plate 17. The rollers 22 are moved radially outwardly on the inclined surfaces 23 of the pressure plate 17 by the centrifugal force, when the rotary speed of the pressure plate 17 connected to the rope reel 2 is increased over a predetermined value at the recoiling state, so that a distance between the pressure plate 17 and the brake rotor 18 is increased, that the brake rotor 18 is urged to the brake plate 20 through the friction pad 19, and that the rotation of the rope reel 2 is suppressed.

Specifically, the rope 1 is recoiled rapidly if the rope 1 is released inadvertently before the crank shaft of the engine is rotated by the torque or power accumulated in the second spiral spring 4 by the pulling action of the rope 1. However, the brake means 9 is operated automatically when the rotary speed of the rope reel 2 is increased over the predetermined value. By the operation of the brake means 9, the rotation of the rope reel 2 is suppressed so as to prevent the housing 6 from being struck and damaged by a knob connected to the rope 1 and to prevent the operator from being injured.

The function of the apparatus 10 for preventing cutting of the spiral spring according to the present invention will be explained hereunder.

In FIG. 3, the outer diameter of the second spiral spring 4 is reduced and the outer peripheral surface of the second spiral spring 4 is separated from the one end 14 of the rotary arm 12, when the second spiral spring 4 is wound enough by the rotation of the rope reel 2 in the clockwise direction in order to accumulate a torque or a power in the second spiral spring 4. In this state, the rotary arm 12 is rotated centering about the central lower portion thereof in the clockwise direction in FIG. 3 by the function of the spring 13, so that the other end 15 of the rotary arm 12 is moved radially outwardly and brought into contact with the inner peripheral surface 8 of the rope reel 2.

The other end 15 of the rotary arm 12 is passed over the projection 16 through the slope thereof, so that the rotation of the engine starting pulley 5 is not prevented from being rotated, when the engine starting pulley 5 is rotated in the clockwise direction in FIG. 3 by the power accumulated in the second spiral spring 4 in order to start the engine.

In case that the second spiral spring 4 is wound enough by the rotation of the rope reel 2 in the clockwise direction, the other end 15 of the rotary arm 12 is brought into contact with the inner peripheral surface 8 of the rope reel 2, and then contact with the radial surface of the projection 16, so that the rope reel 2 is connected to the engine starting pulley 5 by the projections 16, as a unit. Accordingly, if the rope reel 2 is further rotated in the clockwise direction in FIG. 3 to accumulate further a power in the second spiral spring 4, the second spiral spring 4 is prevented from being wound up further and from being cut.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention. The scope of the present invention should be defined by the terms of the claims appended hereto.

I claim:

1. An apparatus for preventing cutting of a spiral spring for an engine starter comprising a rope reel to be rotated by a rope rounded thereon, a spiral spring to be wound up by the rope reel in order to accumulate a power therein, an engine starting pulley driven by the power accumulated in the spiral spring, and a device for preventing the spiral spring from being cut due to an overwinding, said device having a projecting means, which is projected from an outer peripheral surface of the engine starting pulley when the spiral spring is wound up fully by the rope reel and an outer diameter of the spiral spring is reduced, and an engaging means provided on the rope reel for engaging with the projecting means.

2. The apparatus as claimed in claim 1, wherein the projecting means is an arm having one and the other ends urged by a spring so that the one end of the arm is brought into contact with an outer peripheral surface of the spiral spring and the other end of the arm is brought into contact with the engaging means provided on the rope reel.

3. The apparatus as claimed in claim 1, wherein the engine starting pulley forms a barrel drum encasing therein the spiral spring.

4. The apparatus as claimed in claim 2, wherein the engine starting pulley forms a barrel drum encasing therein the spiral spring.

5. An apparatus comprising:

a rope reel that is driven to rotate by a rope rounded thereon;

a spiral spring that is wound up by the rope reel in order to accumulate potential energy therein;

an engine starting pulley that driven by the energy accumulated in the spiral spring; and a device for preventing the spiral spring from being cut due to an overwinding thereof, said device having a projection which projects from an outer peripheral surface of the engine starting pulley when the spiral spring is wound up fully by the rope reel and an outer diameter of the spiral spring is reduced, and an engaging device which is provided on the rope reel and which engages the projection.

6. The apparatus as claimed in claim 5, wherein the projection is an arm having first and second ends, and further comprising a spring that urges the arm so that the first end of the arm is brought into contact with an outer peripheral surface of the spiral spring and the second end of the arm is brought into contact with the engaging device.

7. The apparatus as claimed in claim 5, wherein the engine starting pulley forms a barrel drum encasing the spiral spring therein.

8. The apparatus as claimed in claim 6, wherein the engine starting pulley forms a barrel drum encasing the spiral spring therein.

* * * * *